United States Patent [19]

Kucala, III

[11] Patent Number: 5,904,758
[45] Date of Patent: *May 18, 1999

[54] METHOD FOR CLEANING EXTERIOR SURFACES OF AUTOMOTIVE VEHICLES

[76] Inventor: John T. Kucala, III, 15710 Danford La., Orland Park, Ill. 60462

[ * ] Notice: This patent issued on a continued prosecution application filed under 37 CFR 1.53(d), and is subject to the twenty year patent term provisions of 35 U.S.C. 154(a)(2).

[21] Appl. No.: 08/653,575

[22] Filed: May 24, 1996

[51] Int. Cl.⁶ .................................................. C08J 91/00
[52] U.S. Cl. .................................. 106/8; 106/9; 524/318
[58] Field of Search ................................ 524/318; 106/8, 106/9

[56] References Cited

U.S. PATENT DOCUMENTS

| | | | |
|---|---|---|---|
| 3,853,728 | 12/1974 | Wrzesinski | 204/159.18 |
| 4,158,553 | 6/1979 | Chapman | 51/304 |
| 4,778,524 | 10/1988 | Chapin | 106/10 |
| 5,268,026 | 12/1993 | Henry | 106/8 |
| 5,277,708 | 1/1994 | Stuart, Jr. | 106/8 |
| 5,346,943 | 9/1994 | Khungar et al. | 524/398 |

FOREIGN PATENT DOCUMENTS 883125  11/1981  U.S.S.R. .................... 106/9

*Primary Examiner*—Peter D. Mulcahy
*Attorney, Agent, or Firm*—Michael R. McKenna

[57] ABSTRACT

A novel method for cleaning the exterior surfaces of an automobile or other automotive vehicle. The surface that is to be cleaned is sprayed with a water solution of a mild detergent and then rubbed with a putty-like wad of a rubbing composition until the surface contaminants are loosened and adhere to or are suspended in the wad of rubbing composition. The wad of rubbing composition can be reworked from time to time to expose new, clean portions of the wad. The rubbing composition is substantially water free and contains a fatty acid or fatty ester, a fine abrasive, a polybutylene, and an oil absorbent filler. Various types and quantities of materials for the rubbing composition that will produce satisfactory, improved and optimum results are disclosed.

13 Claims, No Drawings

METHOD FOR CLEANING EXTERIOR SURFACES OF AUTOMOTIVE VEHICLES

FIELD OF INVENTION

This invention relates to a novel method for removing contaminants such as dirt, tar, small flakes of paint, small metallic particles and the like from the exterior surfaces of an automobile or other automotive vehicle, and to a novel rubbing composition for use in such method.

BACKGROUND OF THE INVENTION

Contaminants of various kinds may appear on the exterior painted or metallic surfaces of an automotive vehicle in various ways. Small flakes of paint or small metallic particles may be present on the painted surfaces of such a vehicle even in its brand new condition. Over time, road film such as soil or tar, as well as oxidized paint or tarnished metal surfaces, may contaminate the exterior surfaces of the vehicle.

Mechanical buffing of an automotive vehicle with special buffing equipment is a common method of removing undesirable contaminants from the exterior surfaces of the vehicle. Such equipment is expensive, and many man-hours of work are required to complete such a cleaning job. Moreover, the high speed rotation of the brush carrying the buffing composition often produces swirl marks or scratches on the surface being cleaned, and in the case of cleaning a painted surface can result in burning through the paint.

SUMMARY OF THE INVENTION

As with any cleaning or buffing method, when the method of this invention is to be employed the surface to be cleaned is first freed of loose particles by wiping with a soft cloth or brushing with a soft brush. The area to be cleaned is then sprayed with a water solution of a mild detergent.

Prior to such spraying, a small amount of the rubbing composition used in the method of this invention is formed—typically by hand by the person who is removing contaminants from the external surfaces of the automotive vehicle into a wad or plug that can be held conveniently in the palm of the user's hand. This small quantity of rubbing composition, which has a consistency similar to the consistency of putty, can be squeezed and folded into a shape whose external surfaces can be pressed into contact with the surface being cleaned.

The rubbing composition used with the method of this invention is substantially free of water. Only the abrasive ingredient is water soluble to any extent at all, and that only a few parts per million.

Broadly defined, the rubbing composition used with the method of this invention consists essentially of the following ingredients in the indicated amounts:

About 1% to about 8% by weight of a material selected from the group consisting of fatty acids containing 16 to 20 carbon atoms and fatty esters containing 12 to 18 carbon atoms;

About 20% to about 60% by weight of a fine abrasive;

About 15% to about 50% by weight of a polybutylene; and

About 15% to about 50% by weight of an oil absorbent filler or thickener.

When the proportion of a certain material in a given sample of the rubbing composition used in the method of this invention is expressed in this specification or in the accompanying claims in terms of a stated "percentage by weight," the stated percentage represents either (1) the number of grams of the material in question in the given sample, divided by the total number of grams of all materials in the given sample, or (2) the number of "parts" of the material in question in the given sample, divided by the total number of "parts" of all materials in the given sample, as the case may be.

A given area of the surface that has been sprayed with a mild washing solution is rubbed with a wad or plug of the rubbing composition (most conveniently hand-held) until the contaminants are loosened from the surface and adhere to, or are suspended in, the wad of rubbing composition, thereby being removed from the surface being cleaned. The surface is then wiped dry with a water absorbent piece of soft material such as a soft cloth.

The user of the rubbing composition of the method of this invention reworks the wad from time to time by manually squeezing and folding the wad of material to expose new portions of the wad to be rubbed across the surface being cleaned.

Various types of materials and quantities of materials for inclusion in the rubbing composition used with the method of this invention that will produce satisfactory, improved and optimum results are disclosed below in this specification.

Although the rubbing composition used with the method of this invention is similar to a product that has been employed in the building construction industry for many years, that product is used for a purpose entirely different from the removal of contaminants from a surface being cleaned, and is handled in an entirely different way from the manner in which the rubbing composition is handled in the method of the present invention.

A variant of the rubbing composition itself that differs in an additional significant respect from the building construction product just mentioned is also disclosed below. In this form of the rubbing composition, a small amount of a water soluble alkaline metal salt sufficient to prevent the ph of the composition from falling below about 6.5 to about 9.0 upon coming into contact with water and an acidic contaminant on the surface being cleaned is included in the composition.

ADVANTAGES OF THE INVENTION

Use of the method of this invention produces faster and cleaner results, at less cost, than can be achieved through the conventional use of mechanical buffing equipment to clean the exterior surfaces of an automotive vehicle.

As an additional advantage, the risk of inflicting swirl marks or scratches on the surface being cleaned, and the risk of burning through the paint on a painted surface, are altogether avoided.

The method of this invention can be used at any temperature, whether indoors or outdoors, at which the cleaning of the exterior surfaces of an automobile or other automotive vehicle would ordinarily be carried out. The rubbing composition used with this method, being substantially water free and non-hardening and non-drying, can be stored for extended periods of time under normal ambient conditions, before being used.

Moreover, the rubbing composition that is used with the method of this invention is non-corrosive to all metals, and to glass, rubber, plastic and fiberglass accessories. When it is rubbed across any painted or other exterior surface of an automobile or other vehicle, the residue of the rubbing composition, if any, can be wiped away easily with a dry cloth.

In the novel rubbing composition itself, the presence of a small amount of an alkaline material ensures that even if an acidic contaminant is present on the surface being cleaned, the pH of the rubbing composition at the point of contact with the surface being cleaned will not fall below about 6.5 to about 9.0, or in other words ensures that the surface being cleaned is never exposed to any condition that is anything more than slightly acidic.

DETAILED DESCRIPTION OF PREFERRED EMBODIMENTS OF THE INVENTION

The method of this invention, including the basic nature and characteristics of the rubbing composition employed in it, will be discussed first below. The novel variant of the rubbing composition itself will then be described.

THE METHOD

As mentioned above, when the method of this invention is to be used on a painted surface or other exterior surface of an automobile, the surface to be cleaned is first wiped free of loose particles by wiping it with a soft cloth or brushing with a soft brush. The surface is then sprayed with a mild washing solution, as for example a solution containing one part of a mild soap such as a dishwashing liquid detergent, and three parts water.

Prior to the spraying, a small quantity of the rubbing composition is formed by hand by the user into a wad or plug that can be held conveniently in the palm of the user's hand and has external surfaces that can be pressed into contact with the surface being cleaned. This wad, typically cupped in the user's hand, is rubbed firmly across the surface being cleaned until the contaminants to be removed are loosened from the surface, are caused to adhere to the wad of cleaning composition, and are thereby removed from the surface. The contaminants continue to adhere to the wad of rubbing composition, or are suspended within the composition. When the rubbing composition darkens from use, it may be manually folded by the user to expose a clean surface, and the cleaning process may be continued.

Because the rubbing composition is substantially free of water, it does not dry out or harden over time. It thus may be stored for an indefinite period of time and then used until it becomes so full of various contaminants that a new wad should be used.

In its broadest form, the rubbing composition used with the method of this invention includes about 1% to about 8% by weight of either a fatty acid or a fatty ester. (All weight percentages in this specification and the appended claims are calculated on the basis of the final weight of the rubbing composition.) In formulating the rubbing composition, a pre-blend may be prepared initially of the indicated quantity of the fatty acid or fatty ester together with about 20% to about 60% by weight of a fine abrasive. The fatty acid may be a compound having 16 to 20 carbon atoms, such as oleic acid or linoleic acid, and the fatty ester may be a compound of 12 to 18 carbon atoms, such as a methyl ester derived from vegetable or animal fatty acids. This pre-blend will tend to have a paste-like viscosity or consistency to help suspend the fine abrasive particles when they are added, and will provide lubricity in the final rubbing composition.

The fine abrasive used (in the proportions just indicated) can be any of the well known mild abrasives used in rubbing compositions or polishes for motor vehicles, such as diatomaceous earth, pumice, bentonite, or any other abrasive that has a suitably fine particle size and is substantially insoluble in water. The average particle size should be less than about 12 microns, preferably less than about 8 microns, and most preferably less than about 4 microns. The range of particle sizes in a given embodiment of the rubbing composition is preferably kept relatively narrow, as well. Calcium carbonate is a preferred abrasive, both because it is such a mild abrasive that it is sometimes even used in tooth powders and because of the very small particle size in which the material can be provided, and because of its opacifying or whitening quality, which helps keep the rubbing composition light in color during use, as well.

Blending in about 15% to about 50% by weight of a polybutylene gives the resulting mixture a tacky or sticky consistency. This will cause the final rubbing composition to tend to maintain its wad or plug form when it is in use, and to adhere to various contaminants with which it comes into contact and suspend them within the composition. Polybutylene compounds polymerized at 32° F. (0° C.) to 77° F. (25° C.) are preferred for the rubbing composition that is used in the method of this invention.

About 15% to about 50% by weight of an oil absorbent filler or thickener is then worked into the previously prepared blend of ingredients. This will tend to produce a more gum-like consistency or a consistency similar to the consistency of putty, in the final rubbing composition. The preferred ingredient, hydrated magnesium silicate, acts both as a filler and as an oil absorbent.

As those skilled in the art will recognize, other orders of incorporating the ingredients mentioned into the final rubbing composition may be employed if desired.

Improved results with the method of this invention are obtained when the indicated ingredients of the rubbing composition used with this method have the following percentages by weight:

About 1% to about 5% by weight of fatty acid or fatty ester;

About 20% to about 60% by weight of a fine abrasive;

About 20% to about 40% by weight of a polybutylene material; and

About 20% to about 40% by weight of an oil absorbent filler.

If desired, up to about 1.0% by weight of titanium dioxide can be added as a further opacifying agent. Because of the relative hardness of titanium dioxide, if it is included it must be of very fine particle size and preferably in an amount near the low end of the percentage range just mentioned.

The formulation described in the immediately preceding two paragraphs is similar to the formulation of a gummy product sold by Virginia KMP Corp. However, that product is sold specifically as a caulking or sealing material for various applications in the building construction industry, such as closing the openings around the pipes of a plumbing system or a gas distribution system as they pass through a brick or concrete wall.

Such caulking or sealing uses are altogether different from the method of the present invention. Very much larger quantities of the caulking or sealing material in question are used at any one time, and when put in place are left there permanently. The only motions involved in positioning the caulking or sealing material are pushing or pressing it into a cavity to expand into the space involved and fill the entire cavity. There is no possible reason for any rubbing action; on the contrary, the objective is to put the caulking material firmly and permanently in one place rather than to move it about once it has been properly positioned. Finally, if any dirt or other contaminant does accidentally adhere to the caulking or sealing material either before or after it has been put in place, this is not to be desired, as is shown by the fact that a certain amount of titanium dioxide (an extremely effective opacifying agent) is sometimes included in that product.

Preferred percentages by weight of the ingredients in the rubbing composition used with the method of this invention are about 5% of oleic acid, about 40% of calcium carbonate, about 30% of a polybutylene, and about 25% of an absorbent filler such as magnesium silicate. These proportions of ingredients provide a preferred combination of the various properties contributed by each of the ingredients.

As will be seen, the percentage figures just given add up to 100%, in accordance with the explanation given above (in the Summary of the Invention) of the term "percentage by weight" of the respective constituents contained in the rubbing composition that is used with the method of this invention. When the formulation of the rubbing composition is given in this specification and the accompanying claims in terms of percentage ranges, the particular figures selected from those ranges for the various ingredients will add up, in each case (as, for example, in the preferred formulation just described) to a total of substantially 100 percent.

THE RUBBING COMPOSITION

Although the preferred rubbing composition of the present invention (considered by itself) and the above mentioned caulking or sealing material of the prior art are broadly similar, they differ in another important respect in addition to the differences in their respective methods of use that have just been pointed out. With the caulking or sealing material, it is not important to control the pH of the material if it comes into contact with water. Thus, unlike the preferred rubbing composition of the present invention, no particular effort is made with the known caulking or sealing material to make certain that the composition will not become undesirably acidic in use.

In the preferred rubbing composition of the instant invention, it is important (as already explained above) that when the composition comes into contact with water it shall be no more than slightly acidic, if at all, in order to avoid damage to the surface being cleaned. This can be accomplished by inclusion in the rubbing composition of a small amount of a water soluble alkaline metal salt to prevent the pH of the rubbing composition from falling below about 6.5 to about 9.0 when coming into contact with water and an acidic contaminant on the surface being cleaned.

Of the four ingredients of the rubbing composition used in the method of this invention, only the preferred calcium carbonate is soluble in water to any extent, and that only a few parts per million. However, maintaining the stated pH range, which is chiefly on the alkaline side, does help ensure that there will be no corrosive interaction—even when a water solution of a detergent has been applied to the surface being rubbed—between the rubbing composition and that surface.

While this invention has been described in connection with the best mode presently contemplated by the inventor for carrying out his invention, the preferred embodiments for the method and rubbing composition described are for purposes of illustration only, and are not to be construed as constituting any unnecessary limitations on the invention. Modifications will be obvious to those skilled in the art, and all modifications that do not depart from the spirit of the invention are intended to be included within the scope of the appended claims.

What is claimed as being new and desired to be protected by Letters Patent of the United States is a follows:

1. A method of removing contaminants from the exterior surfaces of an automotive vehicle in which a rubbing composition is held in the hand of the person removing said contaminants, which comprises:

(a) forming by hand a wad of a rubbing composition that can be held conveniently in the palm of said user's hand and whose external surfaces can be pressed by the user into contact with a given area of the surface to be cleaned, said rubbing composition having a consistency similar to the consistency of putty, being substantially free of water, and consisting essentially of the following ingredients in the indicated amounts:
      (i) about 1% to about 8% by weight of a material selected from the group consisting of fatty acids containing 16 to 20 carbon atoms and fatty esters containing 12 to 18 carbon atoms;
      (ii) about 20% to about 60% by weight of a fine abrasive;
      (iii) about 15% to about 50% by weight of a polybutylene; and
      (iv) about 15% to about 50% by weight of an oil absorbent filler,
         wherein all of the above percentages by weight are calculated on the basis of the final weight of the rubbing composition;
   (b) applying a water solution of a detergent to a given area of the surface that is to be cleaned;
   (c) then rubbing said given area by hand with said wad of rubbing composition;
   (d) continuing said rubbing by hand until the contaminants are loosened from the surface being cleaned, are caused to adhere to the wad of rubbing composition, and are thereby removed from the surface; and
   (e) thereafter removing any residue of the rubbing composition that may remain on said given area of the surface being cleaned.

2. The method of claim 1 in which the user of the rubbing composition removes any residue of the rubbing composition that may remain on said given area of the surface being cleaned by wiping said area by hand with a soft piece of water absorbent material.

3. The method of claim 1 in which the user of the rubbing composition reworks the wad from time to time by manually squeezing and folding the wad of material to expose new portions of the wad to be rubbed across the surface being cleaned.

4. The method of claim 1 in which the fatty acid in the rubbing composition is selected from the group consisting of oleic acid and linoleic acid.

5. The method of claim 4 in which the fatty acid in the rubbing composition is oleic acid.

6. The method of claim 1 in which the fatty ester in the rubbing composition is a methyl ester derived from a material selected from the group consisting of vegetable and animal fatty acids.

7. The method of claim 1 in which the fine abrasive is finely divided calcium carbonate.

8. The method of claim 1 in which the polybutylene is an oil.

9. The method of claim 1 in which the oil absorbent filler is magnesium silicate.

10. The method of claim 1 in which the rubbing composition consists essentially of the following ingredients in the indicated amounts:

(a) about 1% to about 5% by weight of a material selected from the group consisting of fatty acids containing 16 to 20 carbon atoms and fatty esters containing 12 to 18 carbon atoms;

(b) about 20% to about 60% by weight of a fine abrasive;

(c) about 20% to about 40% of a polybutylene; and (d) about 20% to about 40% of an oil absorbent filler.

11. The method of claim 10 in which:

(a) the fatty acid is oleic acid;

(b) the fine abrasive is finely divided calcium carbonate;

(c) the polybutylene is an oil polymerized at about 32° F. (0° C.) to about 77° F. (25° C.); and (d) the absorbent filler is magnesium silicate.

12. The method of claim 11 in which the rubbing composition contains up to about 1.0% by weight of titanium dioxide.

13. The method of claim 11 in which the rubbing composition consists essentially of the following ingredients in the indicated amounts:

(a) about 5% by weight of oleic acid;

(b) about 40% by weight of finely divided calcium carbonate;

(c) about 30% by weight of a polybutylene oil polymerized at about 32° F. (0° C.) to about 77° F. (25° C.); and (d) about 25% by weight of magnesium silicate.

* * * * *